May 12, 1942.  R. E. KING  2,282,970
VARIABLE CAPACITY REFRIGERANT EVAPORATOR
Filed Feb. 1, 1940
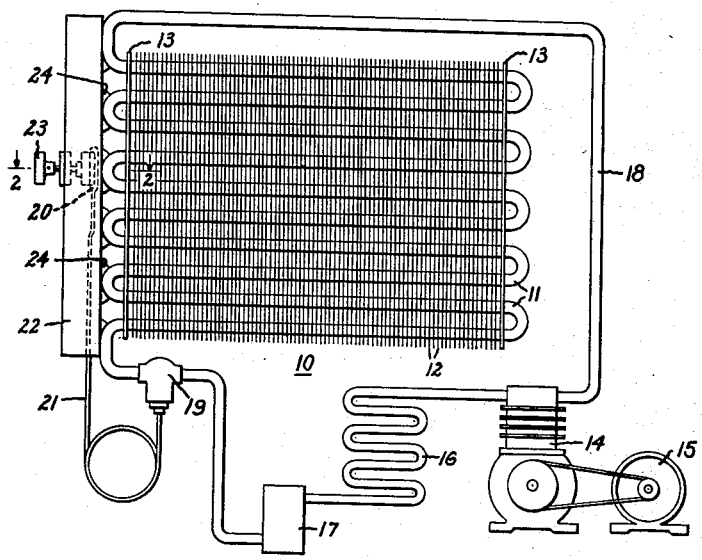
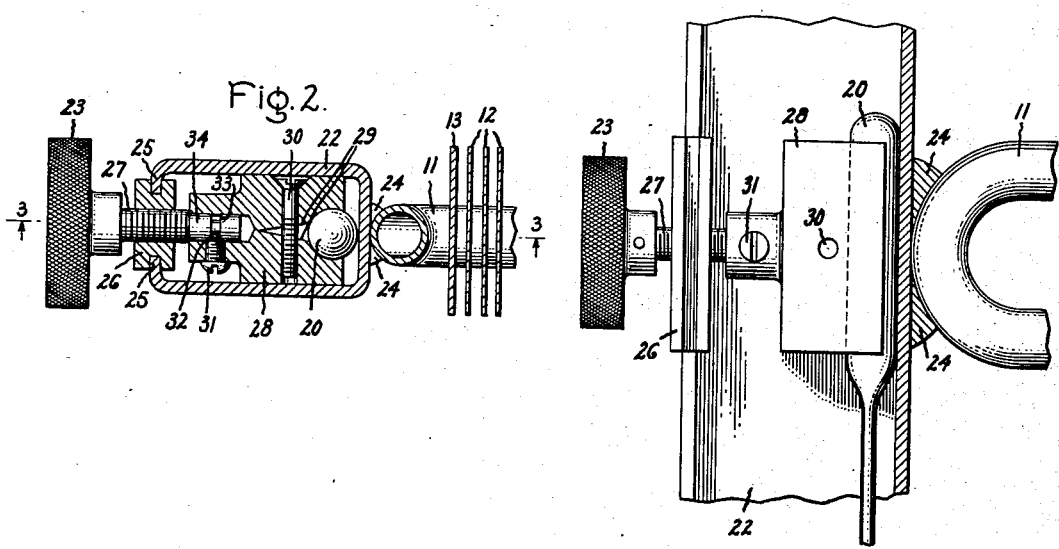
Inventor:
Ralph E. King,
by Harry E. Dunham
His Attorney.

Patented May 12, 1942

2,282,970

UNITED STATES PATENT OFFICE 2,282,970

VARIABLE CAPACITY REFRIGERANT EVAPORATOR

Ralph E. King, Fort Wayne, Ind., assignor to General Electric Company, a corporation of New York Application February 1, 1940, Serial No. 316,797

3 Claims. (Cl. 62—126)

My invention relates to evaporators of the dry type, and particularly to arrangements for adjusting the capacity of such evaporators.

Evaporators of the dry type are frequently employed for cooling storage rooms such as the walk-in coolers in meat markets. These evaporators commonly comprise one or more sinuous coils provided with suitable fins for increasing the heat transfer surface thereof, and a fan for circulating air over the coil and through the storage compartment. The supply of refrigerant to an evaporator of the dry type is commonly controlled by a thermostatic expansion valve which operates to maintain a predetermined number of degrees of superheat of the vaporized refrigerant withdrawn from the evaporator. The load requirements of the storage room may vary widely in accordance with the seasons of the year and the valve adjusted to maintain correct conditions in the summer when the ambient temperature is high may not operate to maintain satisfactory conditions of the air in the compartment during the cooler seasons of the year. For example, a cooling coil which will operate to maintain a temperature of 36° F. and a relative humidity of 85% in the storage room during the summertime when the running time of the condensing unit is relatively high will not maintain the desired humidity during the cooler seasons when the running time of the condenser is low because with the short running time the coil does not have enough capacity to reduce sufficiently the relative humidity of the air. In order to meet the changed conditions during the cooler season, it is therefore necessary to readjust the expansion valve which normally makes it necessary to call in a service man. Accordingly, it is an object of my invention to provide cooling coil of the dry type having an improved arrangement for readily adjusting the effective cooling capacity of the coil.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which Fig. 1 shows a cooling coil embodying my invention connected in the circuit of a refrigerating machine; Fig. 2 is an enlarged sectional view on the line 2—2 of Fig. 1 showing the adjusting mechanism; and Fig. 3 is a sectional view on the line 3—3 of Fig. 2.

The illustrated embodiment of my invention comprises essentially a sinuous evaporating coil provided with a finned heat transfer surface and a heat conducting guide member or track secured in heat exchange relation with the end turns of the coil and provided with an adjustable clamp for selectively securing the thermal bulb or feeler element of the thermostatic expansion valve in heat exchange relation with any one of the end turns of the coil to vary the effective surface area of the coil.

Referring now to the drawing, in Fig. 1, I have shown an evaporator or cooling coil 10 comprising a sinuous tube or extended conduit 11, a plurality of heat transfer fins 12 and end plates 13. The coil is connected in the circuit of a refrigerating machine comprising a compressor 14 driven by a motor 15, a condenser 16, and a liquid receiver 17. During the operation of the refrigerating machine, gaseous refrigerant is withdrawn from the evaporator 10 through a suction line 18 and is compressed in the compressor 14 and discharged into the condenser 16 where it is cooled and liquefied, the liquid refrigerant collecting in the liquid receiver 17. From the receiver 17, the liquid flows into the evaporator 10 under control of a thermostatic expansion valve 19 having a thermal element or feeler bulb 20 and operated in accordance with the difference between the temperature of the coil 11 adjacent one of the end turns thereof and the pressure of the refrigerant within the coil. The power element of the valve 19 (not shown) which is actuated by the thermal element 20 is connected in communication with the thermal element through a flexible tube 21. The adjustment of the thermostatic expansion valve 19 is selected to maintain a predetermined number of degrees of superheat of gaseous refrigerant within the portion of the coil at the point where the thermal bulb is attached. With the thermal bulb in the position shown in Fig. 1, the portion of the conduit 11 above the bulb will contain gaseous refrigerant and the cooling effect of the coil is limited to the lower turns thereof. In order that the portion of the cooling coil 11 which contains liquid refrigerant may be varied in length, I arranged the thermal bulb 20 so that it may be connected to be responsive to the temperature adjacent any one of the end turns at the left end of the coil as shown in the drawing. The arrangement for adjusting the position of the feeler bulb 20 comprises a track or guide 22 and a clamp which may be adjusted by loosening a knob 23 and sliding the clamp along the guide 22 to the desired position where the bulb 20 may again be secured in place by tightening the knob 23.

The construction of the clamping device is clearly shown in Figs. 2 and 3. The guide 22 comprises a metal channel of U-shaped cross-section having its bottom or central portion welded, soldered, or otherwise suitably secured in good heat exchange relation with the end turns of the coil 11 as indicated at 24. The outer edges or sides of the guide remote from the coil are bent inwardly to provide flanges 25 which serve as tracks for a slidable block 26 in which is mounted a screw 27 attached to the knob 23. The thermal bulb 20 is secured in a block 28 having jaws 29 clamped about the element 20 by a screw 30. The screw 27 is pivotally mounted in the block 28 and is held therein by a set screw 31 having a pin 32 entering an annular slot 33 in a smooth shaft portion 34 of the screw 27. It will be apparent that by tightening the knob 23 the thermal element 20 may be held in good heat conducting relation with the bottom of the channel 22 adjacent the coil 11 and that when it is desired to move the thermal element the knob 23 may be turned to loosen the clamping device and afford movement of the block 28 and thermal element to a different position in the guide 22. The position of the thermal element 20 may, therefore, be adjusted quickly and easily and the effective cooling surface of the evaporator may be changed without the necessity of changing the control setting of the thermostatic expansion valve 19. When the full capacity of the evaporator is required, the thermal element normally will be connected to the guide near the top thereof adjacent the coil 11 at the outlet end of the evaporator. The positioning of the thermal element 20 at any point along the guide 22 below the top thereof will reduce the effective cooling area of the coil 11 and will, therefore, prevent short-cycling of the refrigerating machine, that is, operation of the refrigerating machine for short periods at frequent intervals which would be necessitated when the outdoor or ambient temperature is relatively low. This assures sufficient running time to provide adequate reduction of the relative humidity while maintaining the desired dry bulb temperature of the air in the storage compartment. Positions of the thermal bulb 20 on the guide 22 between the points at which the guide is secured to the end turns of the coil 11 control the superheat of the refrigerant vapor so that the predetermined number of degrees of superheat for which the valve is set are maintained at some point in the conduit 11 between the two end turns adjacent which the element is attached. It is, therefore, apparent that I have provided an arrangement for readily adjusting a thermostatic expansion valve to maintain a wide range of capacities of the evaporator or cooling coil.

While I have shown and described my invention in connection with a particular form of evaporator of the dry type, other applications will readily be apparent to those skilled in the art. I do not, therefore, desire my invention to be limited to the construction shown and described, and I intend in the appended claims to cover all modifications within the spirit and scope of my invention.

What I claim as new and desire to secure by Letters Patent of the United States is:

1. A refrigerant evaporator of the dry type comprising an extended conduit and a valve for controlling the admission of refrigerant to said conduit, a temperature responsive element for actuating said valve, guide means including a track secured adjacent a plurality of spaced points along said conduit, and means including a member engaging said guide means for selectively securing said temperature responsive element in heat exchange relation with said conduit at any one of said spaced points to establish the length of the portion of said conduit which shall contain liquid refrigerant.

2. A refrigerant evaporator of the dry type comprising a sinuous conduit having a plurality of end turns and a valve for controlling the admission of refrigerant to said conduit, a temperature responsive element for actuating said valve, a heat conducting guide member secured in heat exchange relation with a plurality of said end turns of said conduit, means including a member slidable along said guide for selectively securing said temperature responsive element in heat exchange relation with any one of said plurality of end turns to establish the length of the portion of said conduit which shall contain liquid refrigerant.

3. A refrigerant evaporator of the dry type comprising an extended conduit and a valve for controlling the admission of refrigerant to said conduit, a temperature responsive element for actuating said valve, guide means including a channel of U-shaped cross section having its central portion secured in heat exchange relation with said conduit at a plurality of spaced points along said conduit and its sides extending away from said conduit, the sides of said channel remote from said conduit being formed to provide a pair of guide flanges, and means including a readily adjustable clamp for selectively securing said temperature responsive element in heat exchange relation with the bottom of said channel at any desired position along said channel to establish the length of the portion of said conduit which shall contain liquid refrigerant, said clamp comprising a member arranged within said channel for gripping said temperature responsive element and a member slidable on said guides and an adjustable screw for forcing said members apart to secure said clamp in position within said channel.

RALPH E. KING.